United States Patent [19]

Mochizuki

[11] Patent Number: 5,766,129
[45] Date of Patent: Jun. 16, 1998

[54] ULTRASOUND DIAGNOSTIC APPARATUS AND METHOD OF FORMING AN ULTRASOUND IMAGE BY THE APPARATUS

[75] Inventor: Takashi Mochizuki, Mitaka, Japan

[73] Assignee: Aloka Co., Ltd., Japan

[21] Appl. No.: 876,060

[22] Filed: Jun. 13, 1997

[30] Foreign Application Priority Data

Jun. 13, 1996 [JP] Japan .................................. 8-152518

[51] Int. Cl.$^6$ .................................................. A61B 8/00
[52] U.S. Cl. .................................................. 600/443; 128/916
[58] Field of Search .................................. 600/443, 447; 128/916

[56] References Cited

U.S. PATENT DOCUMENTS

| | | | |
|---|---|---|---|
| 5,325,859 | 7/1994 | Ishihara et al. | 600/443 |
| 5,379,769 | 1/1995 | Ito et al. | 600/443 |
| 5,419,328 | 5/1995 | Goh et al. | 600/443 |
| 5,706,816 | 1/1998 | Mochizuki et al. | 128/916 X |

*Primary Examiner*—Francis Jaworski
*Attorney, Agent, or Firm*—Marger, Johnson, McCollom & Stolowitz, P.C.

[57] ABSTRACT

An ultrasound diagnosing apparatus comprises an ultrasound transducer for emitting ultrasound beams and receiving reflected beams to form a scanning plane, and for displacing the scanning plane three-dimensionally for N steps; image data processor for obtaining predetermined brightness value data of respective echoes of the received ultrasound beams which define the respective scanning plane and for outputting the brightness value data of the ultrasound beams of the respective scanning plane as one pixel line data; a memory for storing ultrasound image data of M number of ultrasound images into M number of frames, the ultrasound image data of each of the M number of ultrasound images being comprised of N number of the pixel line data produced by the image data processor; writing control circuit for sequentially storing M number of the pixel line data each having a different time phase to the corresponding positions of the respective frames of the memory, the M number of the pixel line data being obtained by carrying out the scanning at each position of the N steps for M times; and display controlling section for sequentially reading out the ultrasound image data stored in the respective frames of the memory one by one and displaying a three-dimensional ultrasound image based on the ultrasound image data.

22 Claims, 8 Drawing Sheets

ULTRASOUND DIAGNOSTIC APPARATUS AND METHOD OF FORMING AN ULTRASOUND IMAGE BY THE APPARATUS

BACKGROUND OF THE INVENTION

1. Field of the Invention

This invention relates to an ultrasound diagnostic apparatus and a method of forming an ultrasound image by the apparatus, and in particular relates to an ultrasound diagnostic apparatus and a method of forming an ultrasound image by the apparatus in which it is possible to clearly display a three-dimensional ultrasound image of an internal organ in motion such as a heart or the like.

2. Description of the Background Art

Ultrasound diagnostic apparatuses are used for diagnosing a living body, in which ultrasound waves are transmitted from a probe toward an object in a living body (e.g. an internal organ or a fetus or the like) and echoes of the reflected ultrasound waves are received by the probe to obtain echo signals, and a tomographic image (B-mode image) or the like is produced based on the echo signals to display it on a screen such as a CRT or the like.

In the meantime, recently, in the field of such ultrasound diagnostic apparatuses, various techniques have been proposed for obtaining a three-dimensional ultrasound image of an object by transmitting and receiving ultrasound waves to and from a three-dimensional region in which the object such as an internal organ or a fetus is positioned. According to these techniques, there is an advantage that the object can be grasped three-dimensionally or spatially through the three-dimensional ultrasound image.

However, in the prior art techniques, there is a problem that they requires a fair amount of computing time for processing an enormous number of coordinate data to form a three-dimensional image. Therefore, it is impossible to obtain such a three-dimensional ultrasound image in a real time base, and therefore these apparatuses can not be practically used. Further, these prior art apparatuses can produce only a three-dimensional surface image of the object, and therefore they can not be used for carrying out diagnosis for the internal condition of the object.

In view of these problems involved in the prior art apparatuses, the inventors of this application have proposed in its co-pending U.S. application (Ser. No.: 08/682,909 now U.S. Pat. No. 5,706,816) a new ultrasound image processing apparatus which can be preferably used as ultrasound diagnostic apparatuses.

In this ultrasound diagnostic apparatus, ultrasound beams are emitted from an ultrasound probe toward a three-dimensional region in which an object such as an internal organ of a living body and a fetus or the like is placed while moving the ultrasound probe, and receiving echoes of the ultrasound beams which are reflected from the object. Echo data obtained from the received echoes are sequentially processed to form a three-dimensional ultrasound image of the object in a substantially real time base.

Further, in this ultrasound image diagnostic apparatus, a new image processing technique which is developed from a volume rendering technique is employed, thereby enabling to produce a transparent image of the inside of the internal organ (hereinafter, such a transparent image is referred to as "three-dimensional transparent image") in a substantially real time base.

Therefore, according to the ultrasound diagnostic apparatus, there are advantages which could not be achieved by the prior art apparatuses. Specifically, it is possible to obtain a three-dimensional image (a three-dimensional surface image or a three-dimensional transparent image) of the object in a substantially real time base, and it is also possible to grasp the surface condition of the internal organ being examined or the internal tissue structure thereof spatially by observing the three-dimensional surface image or three-dimensional transparent image which is being displayed on a screen.

On the other hand, however, in the ultrasound diagnostic apparatus described above, since the three-dimensional image (three-dimensional surface image or three-dimensional transparent image) is produced while the ultrasound probe being displaced, it takes a few seconds to produce one three-dimensional image. In this connection, it should be understood that a time required for producing one three-dimensional image depends on the number of ultrasound beams to be processed for producing the three-dimensional image. Therefore, since all the ultrasound beams emitted toward the three-dimensional region must be processed, it takes 3 or 4 seconds for instance to display the three-dimensional image.

For this reason, when an image of an internal organ in motion such as a heart or the like is to be displayed by a three-dimensional image, the organ moves to change its shape while echo data of the ultrasound beams are processed, thus resulting in a problem in that the obtained three-dimensional image would be unclear and vague. Further, in order to improve a disease diagnosing accuracy for internal organs, it is very effective to display an internal organ in motion such as a heart through a three-dimensional motion image. Therefore, there is a demand for an ultrasound diagnostic apparatus which can display a three-dimensional image in which motions of an internal organ can be shown clearly.

SUMMARY OF THE INVENTION

This invention has been made in view of the problems involved in the prior art apparatuses. Accordingly, a main object of the present invention is to provide an ultrasound image processing apparatus which can clearly display a three-dimensional image of an internal organ in motion such as a heart or the like.

Another object of the present invention is to provide an ultrasound diagnostic apparatus which can display a three-dimensional image of an internal organ in motion such as a heart or the like through a three-dimensional motion picture image.

In order to achieve the objects, the ultrasound diagnostic apparatus according to the present invention comprises:

(a) an ultrasound transducer for emitting ultrasound beams and receiving reflected beams to form a scanning plane, and for displacing the scanning plane three-dimensionally for N steps, where N is a positive integer greater than 1;

(b) image data producing means for obtaining predetermined brightness value data of respective received ultrasound beams which define the respective scanning plane based on echoes thereof and for outputting the brightness value data of the ultrasound beams of the respective scanning plane as one pixel line data;

(c) memory means for storing ultrasound image data of M ultrasound images into M frames, where M is interger greater than 1, the ultrasound image data of each of the M ultrasound images being comprised of N pixel line data produced by the image data producing means;

(d) writing control means for sequentially storing M pixel line data each having a different time phase to the corresponding positions of the respective frames of the memory means, the M pixel line data being obtained by carrying out the scanning at each position of the N steps for M times; and (e) display controlling means for reading out the ultrasound image data stored in the respective frames of the memory means one by one and displaying an ultrasound image based on the ultrasound image data.

In the ultrasound diagnostic apparatus, it is preferred that the start of the scanning and the displacement of the scanning plane are controlled in synchronization with a cardiac signal from a living body such as R-wave.

By repeating the processing synchronized with the cardiac signal for many times until an N-th beat of a heart, the memory means stores three-dimensional ultrasound image data for M images each having different time phases in a periodical motion of the heart. Each of the three-dimensional ultrasound image data is composed of the pixel line data of N lines which are obtained from the electronic scannings carried out at each of N positions and at the same time phase in the respective motion of the heart. In other words, since the period of the heart beats is constant, three-dimensional ultrasound image data stored in each of the frames of the multi-frame memory can produce a three-dimensional ultrasound image which represent a certain condition of the heart at the certain time phase of the periodical motion. Namely, the ultrasound image data stored in each of the frames is formed of N pixel line data which are obtained at the same time phase in each the periodical motions of the heart beats of N times.

Therefore, according to the ultrasound diagnostic apparatus of the present invention, if an ultrasound image is displayed based on the ultrasound image data stored in a particular frame corresponding to a particular time phase in a periodical motion of a heart, the displayed ultrasound image is a stationary three-dimensional ultrasound image representing the condition of the heart at the particular time phase. Further, if a series of the ultrasound image data stored in the respective frames of the multi-frame memory are sequentially and successively reproduced, it becomes possible to display a motion of a heart for one period through a three-dimensional motion picture image.

In this way, according to the present invention, it is possible to display a three-dimensional ultrasound image of an internal organ in motion such as a heart clearly without any affect by the motion of the heart. Further, such a three-dimensional ultrasound image can be displayed in the form of a motion picture. Therefore, it is expected that accuracy for diagnosing disease will be remarkably improved due to its new and unique display image.

In the present invention, it is preferred that the ultrasound transducer includes an array transducer having a plurality of aligned transducer elements which are electronically energized to form the scanning plane, and a mechanism for mechanically displacing the scanning plane for N steps. The displacing mechanism may be constructed from a mechanism which displaces the scanning plane in parallel with the preceding scanning plane or a mechanism which displaces the scanning plane pivotally.

Further, it is also preferred that the image data producing section is constructed so as to be able to selectively produce pixel line data from which a three-dimensional surface image or a three-dimensional transparent image can be produced.

Furthermore, it is also preferred that the memory means is constructed from a multi-frame memory having M frame memories. Further, it is more preferred that the display controlling means includes loop reproduction means which reproduces the ultrasound image data stored in the M frames of the memory means successively.

The present invention is also directed to a method of forming an ultrasound image by an ultrasound diagnostic apparatus. The method comprises the steps of:

(a) performing a plurality of electronic scannings with ultrasound beams for a part of a patient which repeats periodical motion within one period of the periodical motions at a predetermined position in response to an input of a predetermined signal;

(b) obtaining a predetermined brightness value data of the respective beams based on echoes of the ultrasound beams which define the scanning plane of the respective scanning, and producing a plurality of pixel line data of different time phase for each of the respective scannings based on the brightness value data;

(c) storing the pixel line data of the respective scannings sequentially in corresponding positions of a plurality of memories;

(d) displacing a position where the scannings are to be carried out for a plurality of steps and performing a plurality of electronic scannings at respective positions of the plurality of steps of the displacements, and storing the pixel line data of the different time phases obtained at the respective displaced positions into a region of the respective memories in which data has not yet been stored; and (e) reproducing the thus-obtained ultrasound image data stored in the respective memories and comprised of the plurality of pixel line data one by one successively.

In this method, it is preferred that the control signal is a signal from a living body caused by periodical motions of an internal organ of a patient. In this case, it is more preferred that the control signal is a R-wave emitted from a heart of the patient, wherein the plurality of the scannings are carried out within one period between the R-waves, and the scanning plane is displaced for N steps in synchronization with each R-wave.

Other objects, functions and advantages of the present invention will be apparent when the following description of the preferred embodiments are considered taken in conjunction with the accompanying drawings.

DESCRIPTION OF THE INVENTION

Hereinbelow, a description is made with reference to the structure of the ultrasound diagnostic apparatus which produces the three-dimensional image (including three-dimensional surface image and three-dimensional transparent image) used in the present invention as well as the principle for producing such a three-dimensional image.

(1) Overall Structure of the Apparatus

Figure 1:
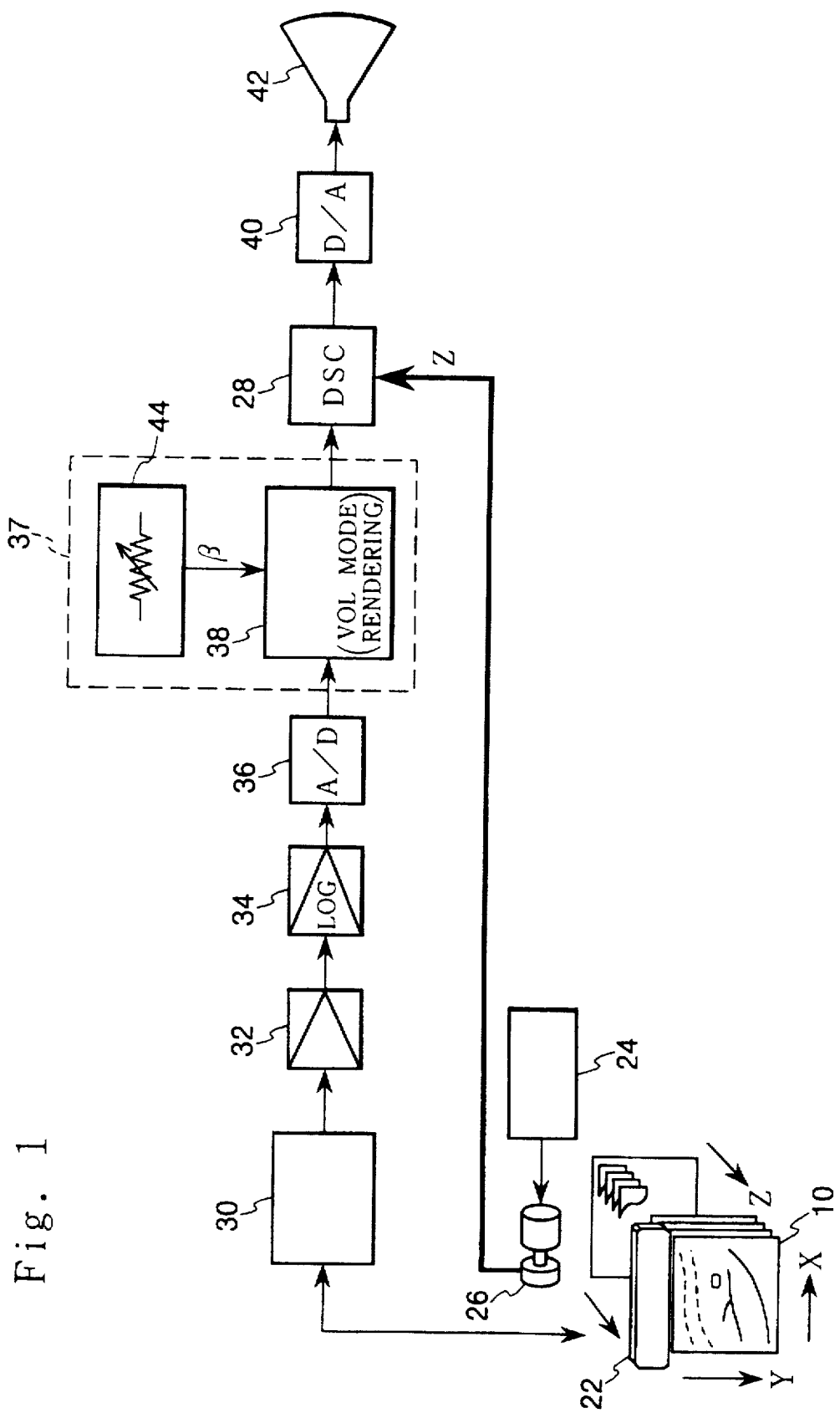
FIG. 1 is a block diagram which shows the overall structure of an ultrasound diagnosing apparatus which can produce a three-dimensional image in a substantially real time base.

FIG. 1 is a block diagram illustrating the basic structure of an ultrasound diagnostic apparatus for producing the three-dimensional image.

In FIG. 1, the reference numeral 22 denotes an ultrasound probe which comprises a transducer for emitting ultrasound beams toward a three-dimensional region such as a living body and for receiving the beams (echoes) that are reflected from an object in the three-dimensional region such as an internal organ of the living body or a fetus or the like. In this embodiment, the ultrasound probe 22 has a linear type array transducer.

Figure 2B:
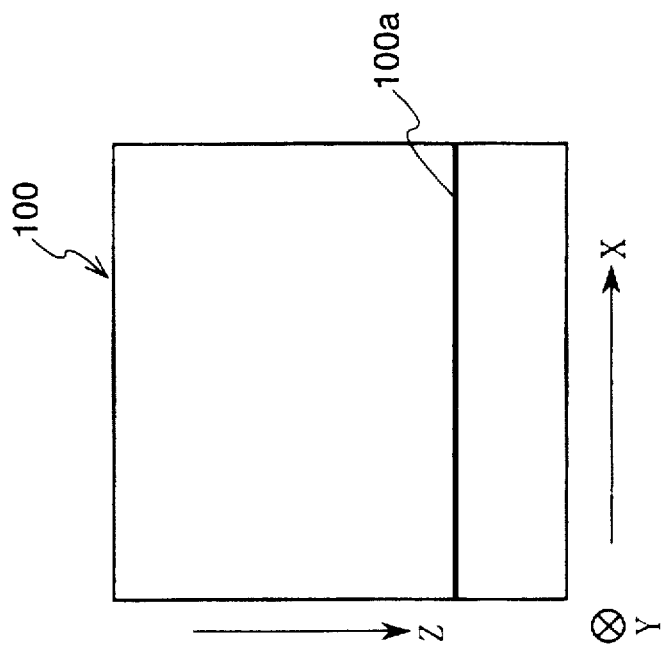
FIG. 2B is an illustration which explains a three-dimensional ultrasound image obtained by the above ultrasound image processing apparatus.
Figure 2A:
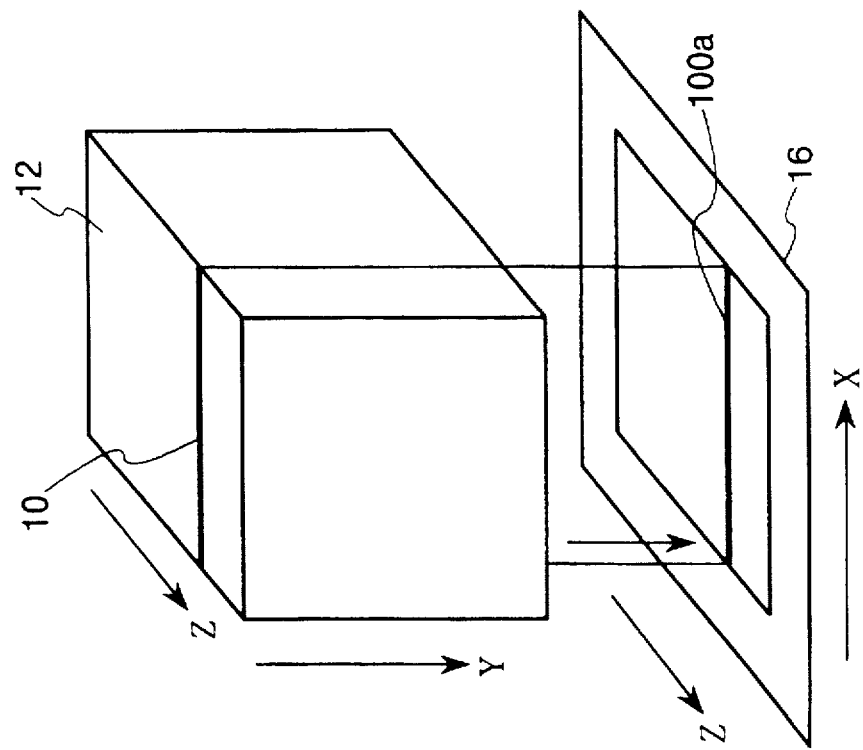
FIG. 2A is an illustration which explains a relationship between a three-dimensional region and a projected image.

By electronically scanning the linear array transducer of the ultrasound probe 22, a scanning plane 10 is formed in an X-Y plane as shown in FIG. 2A. Further, by mechanically scanning the ultrasound probe 22 in the Z direction, the scanning plane 10 is displaced in the Z direction, thereby forming a three-dimensional echo data acquiring region 12 as shown in FIG. 2A (hereinafter, referred to as "three-dimensional region").

In this embodiment, such a mechanical scanning is carried out through a driving device 24. During the mechanical scanning, a rotary encoder 26 continuously detects a position of the ultrasound probe 22 in the Z direction and produces Z coordinate data for the ultrasound probe 22. This Z coordinate data is fed to a digital scan converter (DSC) 28 (described later), and the Z coordinate data is used in the DSC 28 for writing brightness value data of respective ultrasound beams in a frame memory provided therewith.

By mechanically scanning the ultrasound probe 22 in the Z direction while emitting ultrasound beams toward the three-dimensional region 12 and receiving echoes of the ultrasound beams sequentially, it is possible to obtain echoes from the three-dimensional region 12.

In this embodiment, a description is made with reference to a case where the ultrasound probe 22 is mechanically driven in the Z direction by means of the driving device 24. However, it goes without saying that the ultrasound probe 22 can be moved manually by an operator to perform a scanning in the Z direction. In this case, it is also necessary to acquire a Z coordinate data of the ultrasound probe 22 using an appropriate means.

In addition, although in this embodiment an ultrasound probe 22 having a linear array transducer is used, it is also possible to use other types of ultrasound probes having a convex type array transducer or a sector type array transducer or the like. Examples of such an ultrasound probe is disclosed, for example, in U.S. Pat. No. 5,460,179 and U.S. Pat. No. 5,152,294. In a case where these ultrasound probes are used, the Z coordinate data, that is, the yawing angle data of the probe, is sent to the digital scan converter (DSC) 28.

Turning now to FIG. 1, a signal transmission and reception section 30 supplies a transmission signal to the ultrasound probe 22 to energize the transducer to emit ultrasound beams. The signal transmission and reception section 30 also receives echo signals produced based on echoes of the reflected beams received by the transducer of the ultrasound probe 22. The echo signals outputted from the signal transmission and reception section 30 are first amplified by an amplifier 32, and then they are logarithmically amplified by a LOG amplifier 34. The LOG amplifier 34 is provided in order to improve the quality of an ultrasound image. An A/D converter 36 converts the echo signals into digital signals. Then, the converted digital signal (hereinafter, referred to as "echo data") are sent to a three-dimensional (stereoscopic) image data generator (three-dimensional image data producing section) 37.

The three-dimensional image data generator 37 comprises an image processor 38 acting as a transparent image data generator. The three-dimensional image data generator 37 processes echo data obtained from the received echoes of the respective ultrasound beams sequentially to ultimately produce brightness value data for the respective ultrasound beam each time when the echo of the respective ultrasound beam emitted to the three-dimensional region is received (This will be described later in further detail with reference to FIG. 7). The thus-produced brightness value data of the respective ultrasound beam is represented as a brightness value $P(x,y)$ at respective pixel in an ultrasound image. Namely, the pixel is designated so as to correspond to the ultrasound beam of which echo data has been processed.

Further, the image processor 38 is constructed so as to receive an opacity adjustment coefficient $\beta$ determined by the opacity adjuster 44 (This will also be described later in further detail). An appropriate selection of the value for the opacity adjustment coefficient $\beta$ allows the opacity $\alpha$ at each sampling point (voxel) in a beam direction to be set as desired.

The brightness value data thus obtained by the three-dimensional image data generator 37 corresponding to respective ultrasound beam is sequentially outputted to the DSC 28 each time upon such a brightness value data being produced, and then written into predetermined addresses of the frame memory in the DSC 28 in a predetermined order. Namely, this frame memory has X-Y addresses corresponding to the pixels of a display or screen for displaying an ultrasound image on one-to-one basis. Therefore, a series of the brightness value data of the respective ultrasound beams projected toward the three-dimensional region are made to be written sequentially into corresponding predetermined addresses, respectively. As a result, upon completing a scan for the three-dimensional region, the frame memory of the DSC 28 stores the brightness value data (scan data) of the ultrasound beams projected toward the three-dimensional region, that is, ultrasound image data for a single frame of a three-dimensional ultrasound image.

In this case, as described above, the respective ultrasound beams are identified by X-Z coordinates, and the brightness value data for the respective ultrasound beams are written into corresponding predetermined X-Y addresses in the frame memory, respectively (Refer to FIG. 2A and FIG. 2B.).

Ultrasound image data read from the DSC 28, after having been converted by a D/A converter 40 into analog signals, are sent to a display or screen 42 such as a CRT. Then, the display 42 displays a three-dimensional (stereoscopic) ultrasound image.

(2) Production of Real Time Three-dimensional Image

Hereinbelow, a descriptions is made with reference to the principle of production of real time three-dimensional image.

As stated above, FIG. 2A is an illustration which shows a relationship between a three-dimensional region 12 and a projected image.

As shown in FIG. 2A, when an ultrasound beam emitted in the Y direction is scanned in the X direction, a scanning plane 10 is formed on the X-Y plane. Further, when the scanning plane 10 is mechanically displaced in the Z direction to perform a mechanical scan, a three-dimensional region 12 (a three-dimensional echo data acquiring region) is produced.

Each time upon a receipt of the echo of an ultrasound beam projected toward the three-dimensional region 12, an image processing operation for producing brightness value data for the ultrasound beam is carried out. If the thus-obtained brightness value data for all the ultrasound beams which have been sequentially projected toward the three-dimensional region are plotted on a mapping plane 16 (i.e. an X-Z plane 16) which is virtually set as a plane on which the ultrasound beams passing through the three-dimensional region 12 are projected, an ultrasound image for the three-dimensional region is formed on the mapping plane. The ultrasound image corresponds to a three-dimensional ultrasound image which can be obtained by the ultrasound diagnostic apparatus according to the present invention.

FIG. 2B is an illustration which explains a three-dimensional ultrasound image obtained according to the present invention. Namely, by performing image data processing as described above for each of the echo data of the ultrasound beams which have been emitted toward the three-dimensional region 12, an ultrasound image 100 shown in FIG. 2B is obtained based on the brightness value data for the respective ultrasound beams.

Namely, the above described processing is sequentially executed for the echo data for each of all the ultrasound beams emitted toward the three-dimensional region 12. As a result, based on the brightness value data for the respective ultrasound beams, a single frame of an ultrasound image 100 for the three-dimensional region 12 is formed. The thus-formed ultrasound image 100 is considered to be equivalent to the image plotted on the mapping plane 16 as shown in FIG. 2B. Namely, in the ultrasound image 100, one [1] line 100a (one pixel line data) in the X direction corresponds to a single scanning plane 10. Further, the number of plots on the mapping plane 16 matches the number of ultrasound beams. This means that each of the ultrasound beams corresponds to one [1] pixel in the ultrasound image 100. In other words, one [1] ultrasound beam projected to the three-dimensional region corresponds to one [1] pixel in the ultrasound image 100.

The ultrasound image 100 is similar to an image obtained by viewing the three-dimensional region from a point from which the ultrasound beams are emitted. Thus, when the point of emitting the ultrasound beams is taken as a viewpoint, each of the ultrasound beams can be taken as a line of vision. This enables the diagnosed part (three-dimensional region) to be observed as if it is observed by the naked eye.

Figure 3:
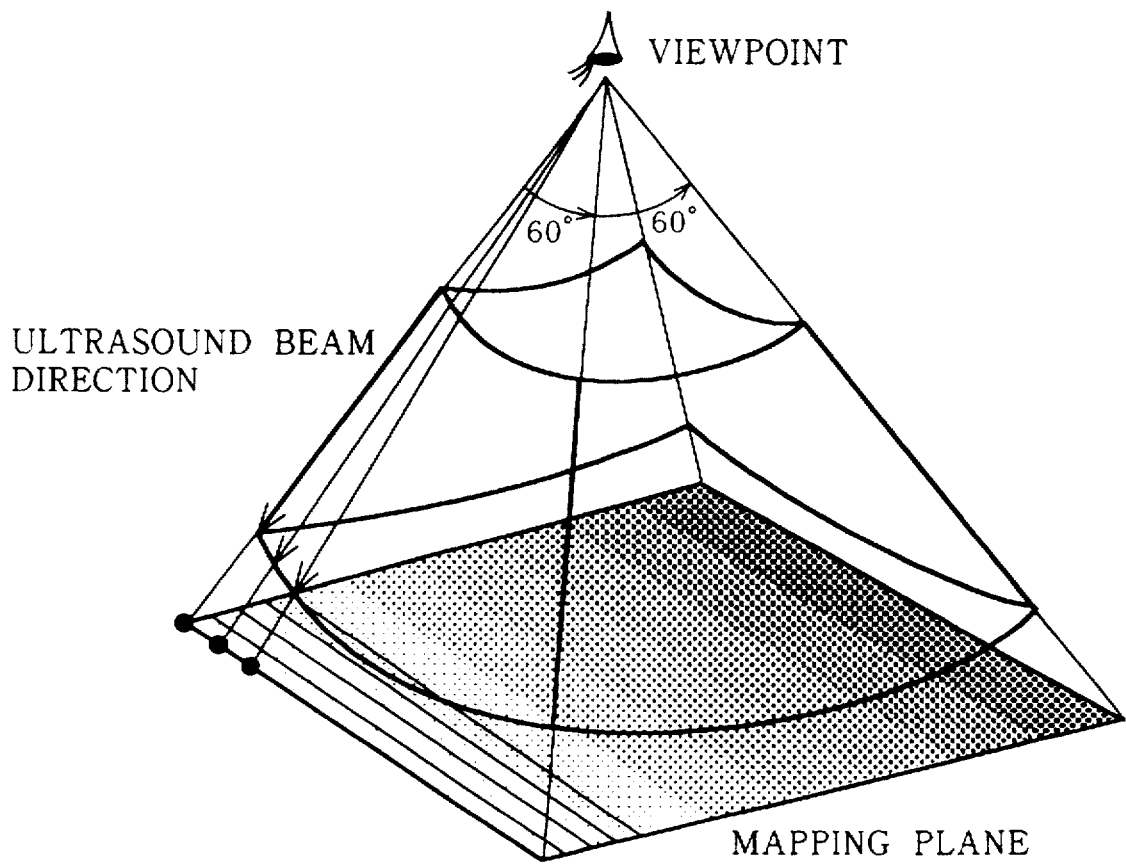
FIG. 3 is another illustration which explains a relationship between a three-dimensional region and a projected image.

FIG. 3 is an illustration which shows another relationship between a three-dimensional region 12 and a projected image. Specifically, in the case shown in FIG. 3, a scan is performed for a three-dimensional region by an ultrasound probe having a convex type array transducer such as the probe disclosed in the above-mentioned U.S. patents.

More specifically, as shown in the drawing, the position of the ultrasound probe having a convex type array transducer is set at a position that is considered to be a viewpoint with respect to the three-dimensional region (an object), from which ultrasound beams are emitted toward the three-dimensional region. In this array transducer, ultrasound beams emitted from the both ends thereof define an angle of sixty [60] degrees to form a scanning plane therebetween. Further, the array transducer is swung through an angle of sixty [60] degrees to perform a mechanical scan. In this way, a scan is performed for the three-dimensional region.

During the scanning, the array transducer sequentially emits ultrasound beams toward the three-dimensional region and receives their echoes reflected therefrom. The received echoes are sequentially processed as described above to produce brightness value data for the respective ultrasound beams. In the same manner as with the case shown in FIG. 1 in which an ultrasound probe 22 having a linear type array transducer is used, the brightness value data for each of the ultrasound beams corresponds to a brightness value at a corresponding pixel of a displayed ultrasound image. The ultrasound image is considered to be the same as one which is plotted on a mapping plane which is virtually set as a plane on which the ultrasound beams passing through the three-dimensional region are projected. In the case shown in FIG. 3, the number of pixels in the ultrasound image also matches the number of ultrasound beams.

As described above, in the ultrasound image obtained according to the present invention, the directions of the ultrasound beams match the directions of lines of vision for image rendering. In other words, the ultrasound image is equivalent to an image which would be obtained by using an ultrasound beam as a line of vision. Therefore, it is possible to produce a three-dimensional ultrasound image which is substantially the same as an image obtained by viewing the three-dimensional region (object) from a viewpoint from which the ultrasound beams are emitted.

Further, because the echo data for the respective ultrasound beams is processed each time the echo of the ultrasound beam is received, it is possible to produce brightness value data for the respective ultrasound beams sequentially. With this result, an ultrasound image of the already scanned part of the three-dimensional region can be produced almost simultaneously with the displacement (scan) of the ultrasound probe. This, in turn, allows an ultrasound image of the three-dimensional region to be produced almost simultaneously with a completion of the displacement (scan) of the probe. This eliminates the necessity for recording an enormous amount of three-dimensional data in a memory such as a geometry memory and reading the same out from the memory for an image production, thereby making it possible to produce a three-dimensional ultrasound image for the three-dimensional region on real time basis.

In this way, it is possible to greatly reduce a time required for producing a three-dimensional image. Further, since no additional echo data memory such as a geometry memory is necessary, it is possible to reduce the number of components and parts. As a result, it becomes possible to provide a practically usable ultrasound diagnostic apparatus which can produce a three-dimensional ultrasound image at a relatively low cost.

(3) Production of Three-dimensional Transparent Image-Volume Rendering

Hereinbelow, a description is made with reference to the principle of Volume Rendering technique used for producing a three-dimensional transparent image. This is carried out by the three-dimensional image data generator 37, the image processor 38 and the opacity adjuster 44 shown in FIG. 1.

As described earlier, according to the present invention, it is possible to selectively display not only a three-dimensional surface image of an object placed in a three-dimensional region but also a three-dimensional transparent image of the object like an X-ray image as necessary (called as "Vol-mode image" by the inventors). The data used for producing such a three-dimensional image is produced by applying a volume rendering technique used in the field of computer image processing to an ultrasound image processing with the characteristics specific to ultrasound waves in mind. Thus, the principle underlying the volume rendering technique is explained first with reference to FIG. 4, FIG. 5 and FIG. 6.

Figure 5:
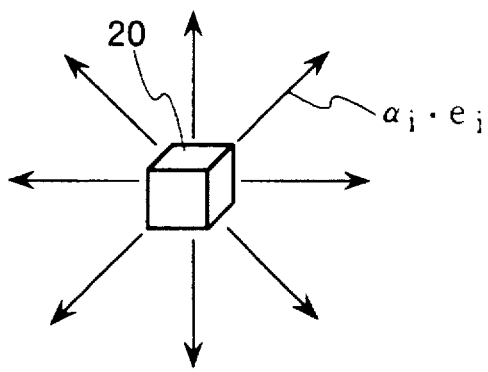
FIG. 5 is an illustration which explains a quantity of luminescence at each voxel 20.
Figure 6:
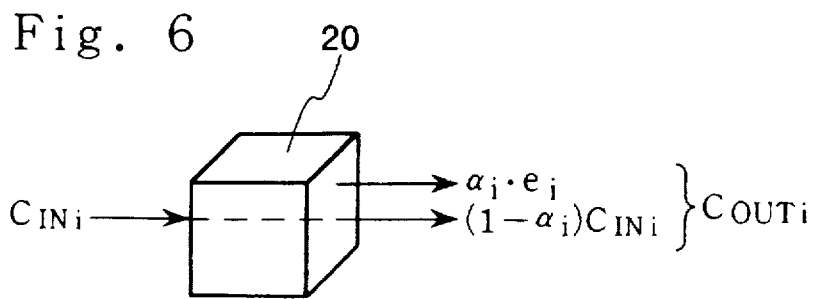
FIG. 6 is an illustration which explains a quantity of outputted light at each voxel 20.

In these drawings, FIG. 6 is an illustration for explaining a relationship between a quantity of inputted light and a quantity of outputted light at each voxel 20, and FIG. 5 is an illustration for explaining a quantity of luminescence at each voxel 20.

More specifically, FIG. 5 and FIG. 6 show the concept of a voxel 20. Here, it should be noted that one [1] voxel 20 corresponds to one [1] echo data which is obtained by A/D converting an echo signal obtained from an echo of an ultrasound beam. In other words, a voxel 20 is defined as a volume element at one of a plurality of sampling points. The sampling point is determined in correspondence with one [1] cycle of the A/D conversion rate of the A/D converter 36 (shown in FIG. 1) operating in synchronization with a sampling clock, as described later in further detail. That is, the voxel 20 can be understood as each one of a plurality of sampling points positioned along the beam projecting direction. Hereinbelow, echo data at each voxel is referred to as "normalized echo data".

Therefore, in the application of the volume rendering technique to the ultrasound image processing apparatus, an ultrasound beam is considered to be a series of a number of voxels, and an ultrasound wave is assumed to be equivalent to light. In other words, in the present invention, echoes of ultrasound waves are visualized as an image on the assumption that the ultrasound waves would be substituted by light.

Figure 4:
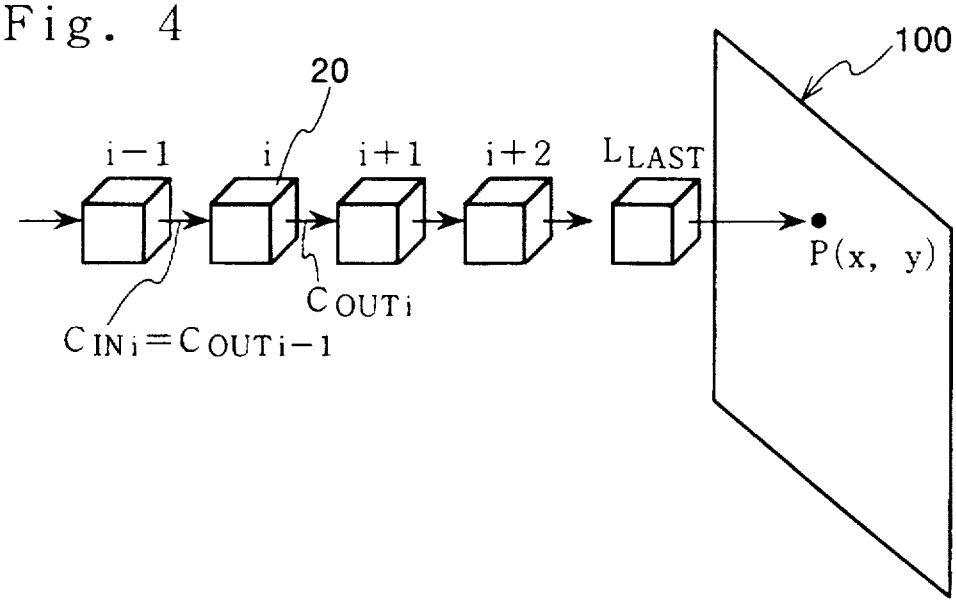
FIG. 4 is an illustration which shows a relationship between a quantity of inputted light and a quantity of outputted light at each voxel 20.

FIG. 4 shows respective voxels 20 i–1 through $L_{LAST}$. A value obtained by processing a number of voxels of an ultrasound beam sequentially from the first (initial) voxel 20 corresponds to a brightness value P(x,y) of one [1] pixel in the ultrasound image 100 on a screen.

Here, in accordance with the volume rendering technique, an opacity $\alpha$ and a transparency (1–$\alpha$) are defined for each voxel 20. In this case, the opacity $\alpha$ correlates with the voluntary luminescence of light at a voxel 20 to its surroundings as shown in FIG. 5. On the other hand, the transparency (1–$\alpha$) correlates with the transmission rate of an ultrasound wave at a voxel 20 transmitted from the immediately preceding voxel 20. In this embodiment, the opacity $\alpha$ is set in a range between zero [0] and one [1]. That is, $0 \leq \alpha \leq 1$. In the present invention, the opacity $\alpha$ is defined as a function of echo data (normalized echo data), and therefore it can be represented, for example, by the following Equation (1):

$$\alpha = \beta \times e^{\gamma} \tag{1}$$

Here, e represents a value (size) of echo data (normalized echo data), and $\beta$ is a constant (an opacity adjustment coefficient). As for $\gamma$, a value preferably greater than one [1], for example, two [2] or three [3], is substituted. As a result, the opacity $\alpha$ varies nonlinearly with respect to the value e of the normalized echo data. This means that the opacity $\alpha$ varies in response to the value (size) of the normalized echo data. In this case, the value (size) of the opacity $\alpha$ correlates with diffusion/scattering of ultrasound wave to surroundings. Further, the value (size) of the transparency (1–$\alpha$) correlates with transmission rate of the ultrasound wave. In this case, the constant $\beta$ is set so as to be variable.

As shown in FIG. 4, for an i-th voxel 20, a quantity of inputted light $C_{INi}$ and a quantity of outputted light $C_{OUTi}$ are defined. In this case, its quantity of inputted light $C_{INi}$ is equal to a quantity of outputted light $C_{OUTi}-1$ of an (i-1)-th voxel 20 that immediately precedes the i-th voxel 20. Thus, this relationship can be represented by the following Equation (2):

$$C_{INi} = C_{OUTi-1} \tag{2}$$

Here, it should be noted that that $C_{IN1}=0$ for a first voxel.

For each voxel, based on the above-described opacity $\alpha$ and transparency (1–$\alpha$), a quantity of luminescence and a quantity of transmitted light are defined. Thus, a quantity of luminescence of i-th voxel 20 is defined as a product between an opacity $\alpha_i$ and normalized echo data $e_i$, that is, $\alpha_i \times e_i$. Further, a quantity of transmitted light of i-th voxel 20 is defined as a product of a transparency (1–$\alpha_i$) and a quantity of inputted light $C_{INi}$, that is, $(1-\alpha_i) \times C_{INi}$. In this case, the quantity of luminescence corresponds with the degree of contribution of the voxel 20 to a brightness value P(x,y) of the ultrasound beam at the corresponding pixel. Further, the value of a quantity of transmitted light corresponds to transmission rate of an ultrasound wave at a i-th voxel 20, when the voxel is considered as a transfer medium of an ultrasound wave. Thus, if the value of the transparency (1–$\alpha_i$) at a voxel 20 is greater, ultimate contribution of the echo data of the voxel 20 to the brightness value P(x,y) also becomes greater.

FIG. 6 is an illustration which shows a quantity of outputted light at each voxel 20. As shown in FIG. 6, in the present invention the quantity of luminescence $\alpha_i \times e_i$ and the quantity of transmitted light $(1-\alpha_i) \times C_{INi}$ at an i-th voxel 20 are added together as shown in the following Equation (3), to determine a quantity of outputted light $C_{OUTi}$ at the i-th voxel 20.

$$C_{OUTi} = (1-\alpha_i) \times C_{INi} + \alpha_i \times e_i \tag{3}$$

In Equation (3), it is to be noted that, from Equation (2), $C_{INi} = C_{OUTi-1}$. This means that the result of computing the quantity of outputted light at a preceding voxel is used in computing one at the current voxel.

While processing is carried out for a first voxel and its succeeding voxels sequentially in accordance with Equation (3), the opacity $\alpha_i$ at each of the voxels 20 is summed. Further, when its sum $\Sigma \alpha_i$ reaches one [1], the processing can be ended. Here, the processing also ends when the processing reaches the voxel $L_{LAST}$ which is the last voxel or a voxel which corresponds to a preset depth. That is, an end determining condition for the processing is represented by the following Equation (4):

$$\Sigma \alpha_i = 1 \text{ or } i = L_{LAST} \tag{4}$$

The end of processing upon satisfying the end determining condition $\Sigma \alpha_i = 1$ in Equation (4) means that the processing is terminated when the cumulative value of the opacity $\alpha_i$ at each of the voxels 20 reaches one [1]. Of course, it is possible to change the end determining condition of Equation (4) so as to meet a particular situation. For example, a predetermined end determining value K, which is one [1] in this case, for setting a maximum of the sum $\Sigma\alpha_i$ may be changed to some other number.

In this embodiment, the quantity of outputted light $C_{OUT_i}$ at the voxel 20 at a time when the end determining condition is satisfied is considered to be the brightness value data of the ultrasound beam, that is, the brightness value P(x,y) at the corresponding pixel in an ultrasound image. Then, the above-described processing is also carried out for the echo data for subsequently received ultrasound beams. Such processing is continued until it is completed for all the ultrasound beams that have been emitted to a three-dimensional region.

As expressed in Equation (3), the brightness value P(x,y) at the pixel in the ultrasound image on a display screen reflects the values of all normalized echo data e of an ultrasound beam from a first voxel to a voxel judged to be an end. However, unlike a mere simple cumulative value of echo data as in the prior art described above, the brightness value obtained in accordance with the present invention reflects both scattering (diffusion) and absorption of an ultrasound wave at respective voxels. Accordingly, it is possible to effectively produce a three-dimensional transparent ultrasound image having a feeling of depth (a stereoscopic feeling) and a transparency like an image formed by a light emitted from a light source and transmitted through respective voxels with scattering and absorption. Further, it is also possible to visualize a part having an unclear boundary, that is, a boundary of tissues whose acoustic impedances are not so distinct from each other.

In connection with the application of the volume rendering technique to the present invention, it is to be noted that an image processing technology utilizing such a volume rendering technique has already been adopted in an X-ray CT apparatus. (Refer, for example, to IEEE Computer Graphics and Applications, Volume 8, Number 5, May 1988, pages 29–37.) However, since an X-ray CT apparatus detects an object with quantitative CT values irrespective of the direction of a projected X-ray, it is not possible to produce a three-dimensional image by using the detected data as they are. For this reason, in the X-ray CT apparatus, in order to produce a three-dimensional image, it is necessary to preset a virtual light source (viewpoint) and then process the detected data, on the assumption that the object is viewed from the viewpoint, by using a complex algorithm.

In contrast with the X-ray CT apparatus, in apparatuses using ultrasound waves, there are the following features. Namely, in the case of ultrasound waves, a relatively strong echo is obtained from a plane perpendicular to an ultrasound beam direction, while a relatively weak echo is obtained from a plane inclined with respect to the ultrasound beam direction. Further, a reflection from a hard part produces a strong echo, while a reflection from a soft part produces a weak echo.

Consequently, in the image processing apparatuses using ultrasound waves having the above properties, obtained data, that is, the normalized echo data, reflect the feature and characteristic of a tissue as well as the direction of an ultrasound beam with respect to an object, namely, an angle formed between the direction of a line of vision and the surface of an object. Therefore, in the image processing apparatuses using ultrasound waves, it is possible to easily produce an image having a stereoscopic transparent effect (a depth feeling) by using the obtained echo data as they are. Namely, the application of a volume rendering technique to ultrasound image processing apparatuses has the advantage that it is possible to easily produce, with a relatively simple algorithm, a three-dimensional transparent image having a depth feeling that has never been attained by the prior art apparatuses or methods.

(4) Circuit Configuration for Volume Rendering

Figure 7:
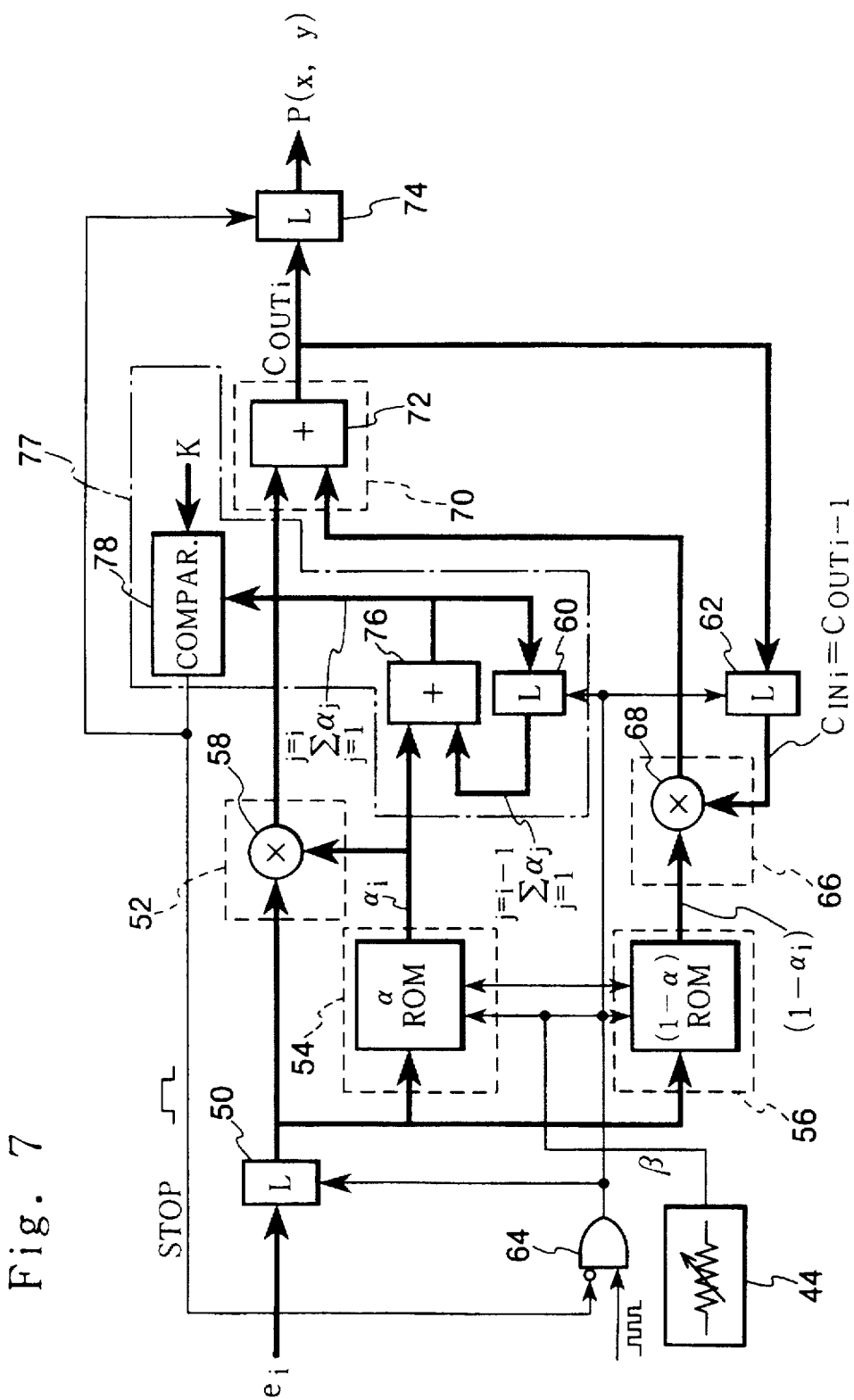
FIG. 7 is a block diagram which illustrates an example of the three-dimensional image data producing section shown in FIG. 1.

FIG. 7 is a block diagram illustrating a concrete example of a circuit configuration of the image processor 38 shown in FIG. 1. As shown in FIG. 7, normalized echo data $e_i$ at an i-th voxel 20 which has already been A/D converted is sequentially inputted to the image processor 38. The inputted echo data $e_i$ is first latched by a latch circuit 50, and then it is inputted to a luminescence quantity operator 52, an opacity operator 54 and a transparency operator 56, respectively. The luminescence quantity operator 52 comprises a multiplier 58. The multiplier 58 calculates the luminescence quantity as a product $e \times \alpha$ by multiplying normalized echo data e by an opacity $\alpha$ at each voxel 20. In this embodiment, the opacity operator 54 comprises an $\alpha$ ROM. The $\alpha$ ROM includes a table having data concerning a correspondence relationship between the normalized echo data e and the opacity $\alpha$ at each voxel 20. Similarly, the transparency operator 56 comprises a $(1-\alpha)$ ROM, which includes a table having data concerning a correspondence relationship between the normalized echo data e and the transparency $(1-\alpha)$ at each voxel 20.

Consequently, when the normalized echo data $e_i$ of an i-th voxel 20 is inputted into the opacity operator 54, the opacity operator 54 outputs opacity $\alpha_i$ at the voxel 20. Further, when the normalized echo data $e_i$ of the i-th voxel 20 is inputted into the transparency operator 56, the transparency operator 56 outputs transparency $(1-\alpha_i)$ at the voxel 20.

The opacity operator 54, the transparency operator 56, the latch circuit 50, a latch circuit 60 and a latch circuit 62 are all supplied via an AND gate 64 with a sampling clock. This sampling clock is also supplied to the A/D converter 36 shown in FIG. 1 for an A/D conversion. As a result, this sampling clock causes other circuits shown in FIG. 7 to operate in synchronization with the A/D converter 36. This enables normalized echo data e at each sampling point, that is, normalized echo data e at each voxel 20, to be processed sequentially.

The output of the transparency operator 56 is supplied to a transmitted light quantity operator 66 which comprises a multiplier 68. The multiplier 68 multiplies a transparency $(1-\alpha_i)$ outputted from the transparency operator 56 by a quantity of outputted light $C_{OUT_{i-1}}$ of the immediately preceding (i−1)-th voxel 20 latched by latch circuit 62. Namely, the transmitted light quantity operator 66 outputs a quantity of transmitted light as a product $C_{IN_i} \times (1-\alpha_i)$ by multiplying a quantity of inputted light $C_{IN_i}$ of the i-th voxel by a transparency $(1-\alpha_i)$ at the voxel 20.

A light quantity adder 70 which is constructed from an adder 72 adds the quantity of luminescence to the quantity of transmitted light based on Equation (3), to output the sum as a quantity of outputted light $C_{OUT_i}$ at the i-th voxel 20. The quantity of outputted light $C_{OUT_i}$ outputted from the light quantity adder 70 is supplied to a latch circuit 74 having a gate function and the latch circuit 62, respectively. That is, the quantity of outputted light at an i-th voxel 20 is fed back via the latch circuit 62 to the transmitted light quantity operator 66 for computing a quantity of outputted light at an immediately succeeding (i+1)-th voxel 20.

An end determination section 77 determines an end of the above-described processing performed along the projecting direction of an ultrasound beam, that is, a series of voxels. More specifically, the end determination section 77 comprises an adder 76, a latch circuit 60 and a comparator 78. The adder 76 sequentially receives opacity $\alpha$ of respective voxels 20 as its input, while the adder 76 receives at its other input terminal an output from the adder 76 in a fed back manner via the latch circuit 60. This configuration allows the adder 76 to output from its output terminal a cumulative value $\Sigma\alpha_i$, which is the sum of the opacity $\alpha$ at each of voxels 20 summed sequentially from one at a first voxel 20.

The comparator 78 compares the cumulative value $\Sigma\alpha_i$ with a predetermined end determination value K. And when both values match, the comparator 78 outputs an end determination pulse. More specifically, the end determination section 77 outputs an end determination pulse when the cumulative value $\Sigma\alpha_i$, which is obtained by adding the opacity $\alpha$ of the respective voxels sequentially, reaches the predetermined end determination value K. The value K is usually set to one [1].

The end determination pulse is supplied to the AND gate 64 after having been inverted by an inverter at one of its input terminals, and the end determination pulse halts a pass-through of the sampling clock. Further, the end determination pulse is also supplied to the latch circuit 74 to release a latch of a quantity of outputted light $C_{OUT}$ of the voxels 20 outputted from the light quantity adder 70.

The quantity of outputted light $C_{OUT}$ becomes the brightness value data of the ultrasound beam which corresponds to a brightness value P(x,y) at a pixel in an ultrasound image on a display screen. In this regard, it is to be noted that the pixel holds brightness value P(x,y) for the corresponding ultrasound beam whose echo data has been processed as described above. The thus-generated brightness value data is then fed to the DSC 28 sequentially. In the DSC 28, the brightness value data for each of the ultrasound beams is sequentially stored in a predetermined address of a frame memory.

As previously described, not only when the above processing has been carried out for all the voxels including the last voxel 20 of an ultrasound beam, but also when the above processing has been carried out for the respective voxels preceding the voxel 20 corresponding to a preset depth along the beam direction, the end determination section 77 also halts processing echo data, in a manner similar to that described above. Namely, the end determination section 77 determines an end of processing, when processing reaches a voxel at a preset depth (or the final voxel), or when the sum $\Sigma\alpha_i$ of an opacity $\alpha_i$ at respective voxels 20 summed sequentially from one at a first voxel 20 reaches the predetermined end determination value K, which is usually set to one [1].

Consequently, in the case where respective values of opacity $\alpha$ of voxels on an ultrasound beam (a line of vision) which are to be sequentially added are large enough, the end determination section 77 halts the processing in a relatively early stage, to produce, for example, a transparent image only as far as the tissue surface, instead of deep into tissue entrails. In other words, if an opacity varying unit for varying the value of opacity is further provided, it is possible to set a desired value to the opacity $\alpha$ with respect to the normalized echo data e, which is used as a variable factor in the end determining condition of the end determination section 77.

In this way, it becomes possible to change the displayed three-dimensional image of the object from the three-dimensional transparent image of the object to the three-dimensional surface image thereof as necessary by adjusting or varying the value of opacity appropriately.

As described above, according to the circuit configuration shown in FIG. 7, sequential processing for voxels 20 in each of a plurality of ultrasound beams starts from the first voxel 20 along the beam projecting direction. Therefore, a quantity of outputted light $C_{OUTi}$ at an i-th voxel 20 outputted from the quantity of light quantity adder 70 is sequentially used for computing a quantity of outputted light $C_{OUTi+1}$ at an immediately succeeding (i+1)-th voxel 20 in a feedback manner. In other words, in computing a quantity of outputted light $C_{OUTi}$ at an i-th voxel 20, the echo data of the preceding voxels are reflected thereto. As a result, in the brightness value data of the ultrasound beam which corresponds to the quantity of outputted light $C_{OUT}$, the echo data of the respective voxels of the ultrasound beam are reflected, and the thus-obtained brightness value data is used as a brightness value P(x,y) for a pixel corresponding to the ultrasound beam. The brightness value data P(x,y) is sequentially stored in a predetermined address in the frame memory of the DSC 28 as the brightness value P(x,y) of the corresponding pixel.

Upon completion of processing the ultrasound beam as described above, the processing for a next ultrasound beam starts. When the above described processing is carried out for all the ultrasound beams, the brightness value data for the ultrasound beams are stored at predetermined addresses of the frame memory as brightness values at the corresponding respective pixels, from which a single frame of an ultrasound image for the three-dimensional region is produced. Thereafter, the brightness value data is read from the frame memory in the DSC 28 sequentially to display the ultrasound image on a display screen 42.

In addition, in this example, the opacity $\alpha$ is determined in accordance with Equation (1), and the opacity adjustment coefficient $\beta$ in Equation (1) can be adjusted by the opacity adjuster 44 as described above. Accordingly, by appropriately adjusting the opacity adjuster 44, it is possible to adjust an emphasis on either the transparent effect or the stereoscopic effect in a three-dimensional ultrasound image, as well as the depth feeling in a three-dimensional transparent image. Such adjustment can be carried out by adjusting an adjuster such as a dial or lever by an operator while observing the image displayed on a screen in a real time base.

(5) Advantage of the Ultrasound Image Processing Apparatus

The ultrasound image formed by the above-described ultrasound diagnostic apparatus is advantageous in diagnosing a living body, since it is formed into a three-dimensional surface image of an object such as an organ or a fetus or a three-dimensional transparent image capable of displaying the inside of the object like an X-ray image. Also, according to the ultrasound diagnostic apparatus, since the respective ultrasound beams emitted toward the three-dimensional region correspond to the respective pixels in an ultrasound image of the three-dimensional region, the number of the data to be processed for obtaining the ultrasound image can be reduced. Further, since ROM tables having data concerning a relationship between a value of echo data and an opacity and data concerning a relationship between a value of echo data and a transparency are used effectively, it is possible to produce such a three-dimensional ultrasound image on a real time base.

In the circuit configuration described above, each of the opacity operator 54 and the transparency operator 56 is formed from an individual ROM, respectively. However, in the above described apparatus using a binary digital circuit, it is possible to substitute these ROMs with a single common ROM. In this modification, an output of the common ROM is inverted to obtain a complement of 1 [one], and a transparency $(1-\alpha)$ is computed based on the output from the ROM. In more detail, a transparency $(1-\alpha_i)$ is obtained by subtracting from one [1] an opacity $\alpha_i$ outputted from the $\alpha$ ROM.

Further, although in the ultrasound diagnostic apparatus described above Equation (4) uses one [1] as a predetermined end determination value K, it is also possible to have a means for varying this value K. If such a means is provided, it becomes possible to adjust the picture quality of an ultrasound image while observing the ultrasound image on a screen which is being produced in a substantially real time base.

Furthermore, in the ultrasound diagnostic apparatus described above, the viewpoint from which an object is considered to be seen matches the point from which ultrasound beams are emitted toward the object. However, the ultrasound diagnostic apparatus of the present invention is in no way limited to such a structure. It is possible to set the viewpoint to a different point from the beam emitting point. In such a case, another algorithm which is similar to one performed in the X-ray CT apparatus is additionally carried out for producing a three-dimensional image considered to be viewed from the viewpoint.

(6) three-dimensional Image of Internal Organ in Motion such as Heart

Hereinbelow, a description is made with reference to the case where an internal organ in motion such as a heart of a patient is to be displayed through a three-dimensional image by using the ultrasound diagnosing apparatus described above.

Figure 8:
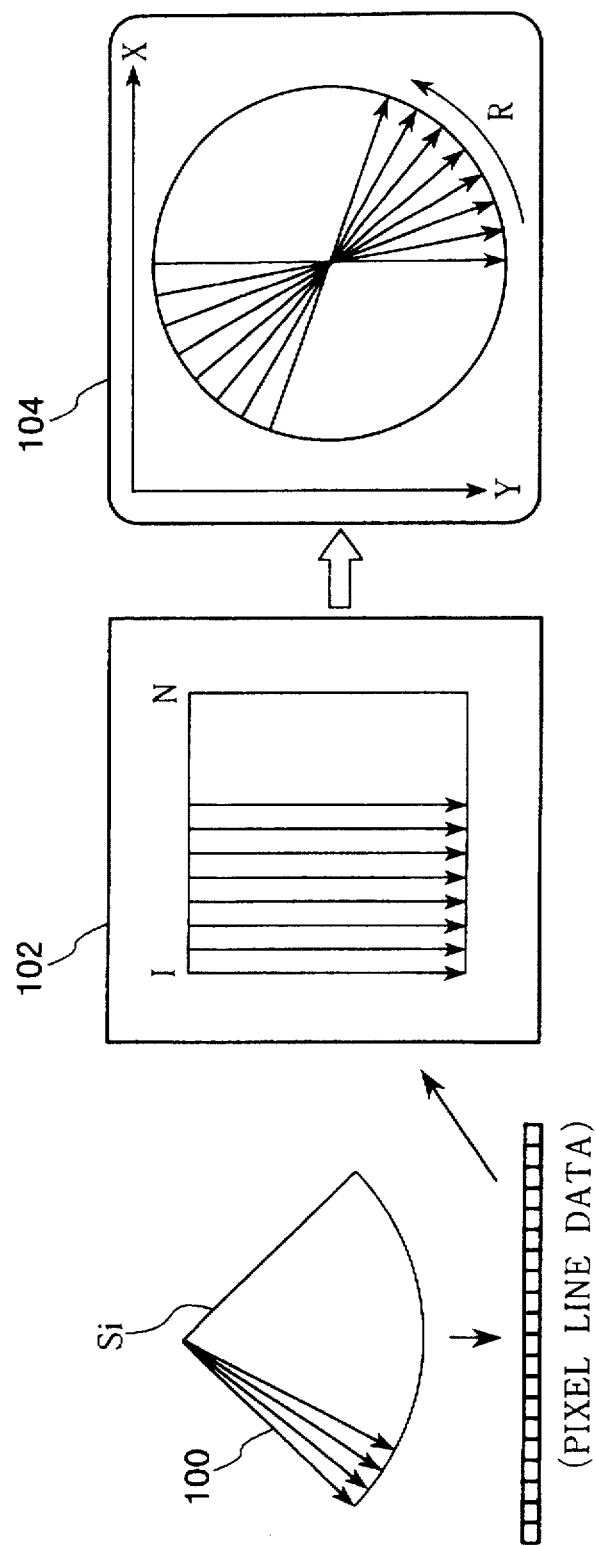
FIG. 8 is an illustration which shows a principle of production of a three-dimensional image for an internal organ in motion such as a heart of a patient.

First, FIG. 8 is an illustration which shows the processes for producing a three-dimensional image by scanning a three-dimensional region in which an object such as a heart is positioned. In this case, it is to be noted that in this example the scanning is carried out by rotating a sector-shaped scanning plane S around its vertical axis passing the apex of the sector-shaped scanning plane S.

When a heart of a patient is to be diagnosed using the scanning method as described above with reference to FIG. 3, it is difficult to perform a scanning for a three-dimensional region in which a heart a patient is positioned due to the existence of ribs of the patient. Therefore, in the case shown in FIG. 8, a sector type array transducer for sector-scanning is used, in which ultrasound beams are projected toward the heart through the space between the ribs to obtain a sector-shaped scanning plane (B-mode scanning plane) containing the heart. Echo data obtained from the ultrasound beams defining the scanning plane are sequentially undergone the volume-rendering processings as described above to obtain a pixel line data (brightness value data to be stored in series of pixels) based on the echo data obtained from the scanning plane. Further, by carrying out such B-mode scannings at different positions while rotating the scanning plane around the vertical axis, it becomes possible to scan the three-dimensional region including the heart without any affect from the ribs.

In more details, in this example, when an ultrasound probe having the sector type array transducer is electronically scanned, a sector-shaped scanning plane (B-mode scanning plane) S is formed as shown in FIG. 8. By rotating the ultrasound probe mechanically, it is possible to displace the scanning plane S rotationally around its vertical axis. In other words, it is possible to displace a position where the sector scanning is to be carried out in the rotational direction. With the result of the rotation of the scanning plane S, a three-dimensional echo data acquiring region having a conical shape with a spherical bottom surface is obtained. In other words, a plurality of B-mode scannings are carried out for the three-dimensional region.

Echo data obtained from the ultrasound beams which define each of the scanning planes S is sequentially undergone the volume-rendering processing described above to obtain brightness value data for the respective ultrasound beams. Thus obtained brightness value data of the respective ultrasound beams defining the scanning plane are transformed into a single pixel line data (a series of pixels along a singe line) wherein one beam corresponds to one pixel, as described above. Namely, the echo data obtained from one scanning plane is represented by the one pixel line data. Then, as shown in FIG. 8, such one pixel line data is written into a frame memory 102 (e.g. first line in the memory). As is understood from the above explanation, in order to obtain the one pixel line data for one scanning plane, it takes a time that is equal to a time required to produce a B-mode image for one frame.

Next, after rotating the ultrasound probe for a predetermined angle, the array transducer is electronically scanned again at the displaced position to form another scanning plane S. Based on echo data obtained from the ultrasound beams which define the another scanning plane, one pixel line data is obtained and then the data is written into the next line in the frame memory 102.

In this way, by rotating the ultrasound probe for N steps (e.g. 180 degree) while the electronic scanning by the array transducer being carried out at each of the N steps, N pixel line data which are obtained from the N scanning planes are written into the frame memory 102. The N pixel line data constitute three-dimensional ultrasound image data for one frame. The ultrasound image data is then fed to a digital scan converter (DSC) 104 as shown in FIG. 8.

In this connection, the pixel line data stored in the frame memory 102 is represented by the polar coordinates. Therefore, as shown in FIG. 8, in the DSC 104, the line pixel data read out from the frame memory 102 are converted into data of the rectangular coordinates. In other words, when the scanning method shown in FIG. 8 is used, the brightness value data to be written into the frame memory 102 are identified by the polar coordinates. This is because they are obtained by rotating the scanning plane, which is different from the scanning method shown in FIG. 3. Therefore, if the pixel line data stored in the frame memory 102 is sequentially reproduced as they are, it is not possible to obtain a display image which is viewed from a view point. For this reason, coordinate transformation shown in FIG. 8 is performed in the DSC 104. As a result of the coordinate transformation, each of the pixel line data is represented with the rectangular coordinates, so that an ultrasound image formed under the rectangular coordinates can be displayed in a screen such as CRT.

As described above, according to the system and the method shown in FIG. 8, B-mode scannings are repeatedly carried out for N times, and a three-dimensional ultrasound image is produced based upon the data obtained by the B-mode scannings of N times. Therefore, there is a few second time lag between the first scanning and the last scanning that is carried out N times later than the first scanning. For this reason, when a three-dimensional image for an internal organ in motion such as a heart is to be produced by the system shown in FIG. 8, a few times of heartbeats are caused during the scannings of N times which are required for the formation of the ultrasound image. As a result, such motions of the heart by the heartbeats affect the formation of the ultrasound image, thus leading to distorted and unclear ultrasound image to be displayed.

In view of the problem as discussed herein, the following ultrasound diagnostic apparatus according to the present invention is improved so as to be able to display an internal organ in motion such as a heart through a clear three-dimensional motion picture image.

DETAILED DESCRIPTION OF THE PREFERRED EMBODIMENTS

Hereinbelow, the principle of the formation of the three-dimensional motion picture image according to the present invention and the ultrasound diagnostic apparatus which can produce such a three-dimensional motion picture image will be described with reference to the preferred embodiments shown in FIGS. 9 and 10.

Figure 9:
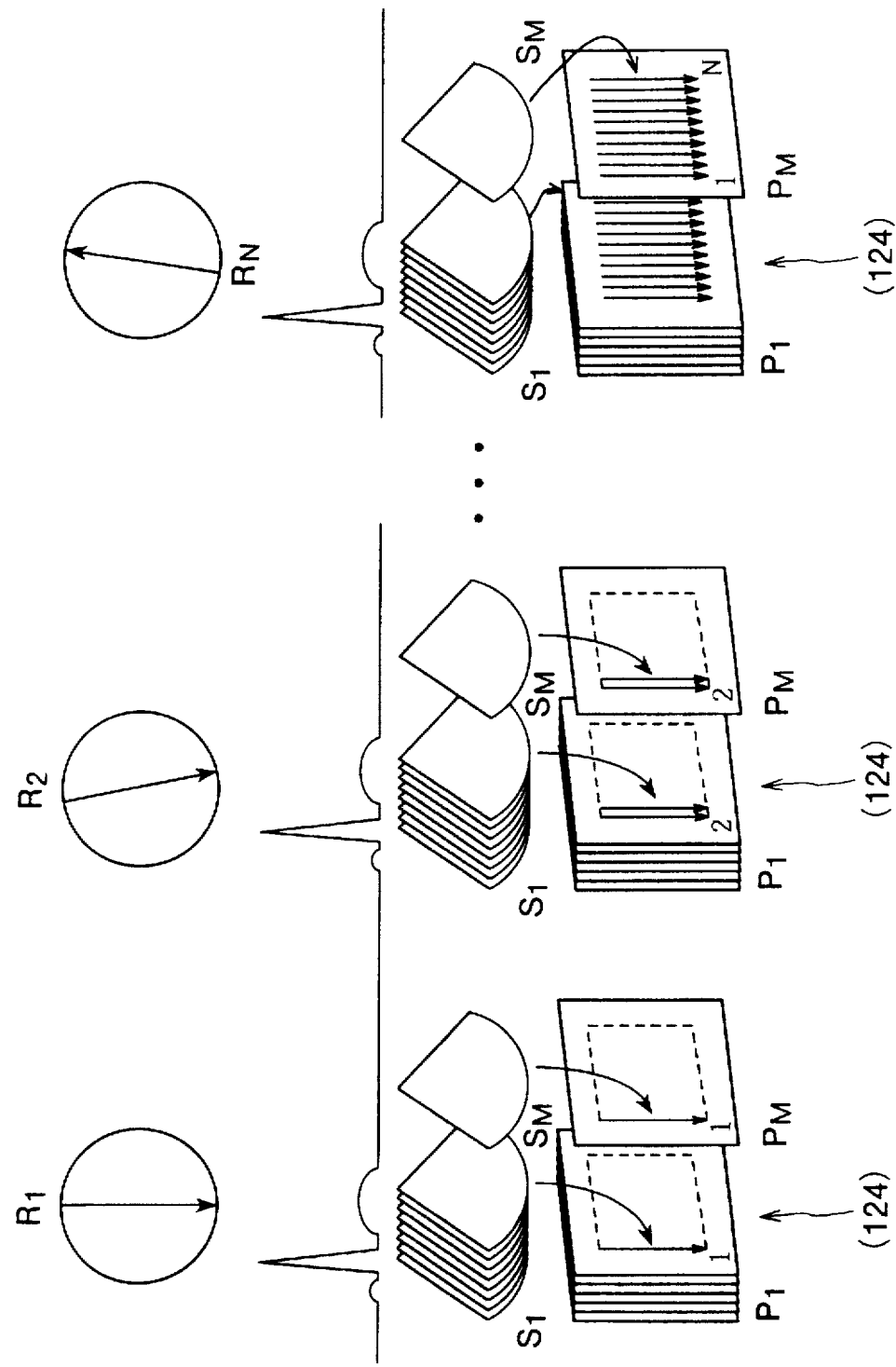
FIG. 9 is an illustration which shows a principle of a three-dimensional motion picture image according to the present invention.

FIG. 9 shows the principle of the formation of the three-dimensional motion picture image according to the present invention. In this connection, it should be noted that, as is the same as the case shown in FIG. 8, the following descriptions are made with reference to the case where an ultrasound probe having a sector type array transducer which can form a sector-shaped scanning plane is used and such a sector-shaped scanning plane is rotated mechanically around the vertical axis which passes the apex of the sector-shaped scanning plane for 180 degree over N steps.

Specifically, in FIG. 9, the uppermost row indicates positions of the scanning plane R1, R2 ... RN (positions of the scanning plane in the rotational direction). The second row indicates a waveshape of a cardiac signal (R-wave) which is one of examples of signals from a living body. The third row depicts scanning planes which are formed during one beat of a heart at each of the N positions. Further, the lowermost row depicts data storing condition of a multi-frame memory (cine memory) during the period of one beat of a heart at each of the N positions, wherein the multi-frame memory comprises M frames which store one frame ultrasound three-dimensional image data, respectively. In this drawing, the left side shows the processing which is to be carried out after the first beat of the heart is detected. Further, the center thereof shows the processing which is to be carried out after the second beat of the heart is detected. Furthermore, the right side shows the processing which is to be carried out after the N-th beat of the heart is detected.

In more details, first the ultrasound probe is held at a predetermined position so that the scanning plane is directed to the position R1. When a control signal based on a cardiac signal (R-wave from ECG) is inputted at that condition, that is a first beat of the heart is detected at that condition, B-mode scannings are carried out for M times at that position to form M scanning planes S1–SM as shown in FIG. 9. Each time upon one B-mode scanning is carried out, the echo data obtained from each of the ultrasound beams which define the B-mode scanning plane is sequentially undergone the volume-rendering processing described above, thereby producing one pixel line data for each of the B-mode scanning planes. Namely, as shown in FIG. 9, each time upon the array transducer is electronically scanned, one pixel line data which corresponding to the scanning plane is produced.

The one pixel line data corresponding to each of the scanning planes S1–SM is written into each of the corresponding frames (memories) P1–PM of the multi-frame memory sequentially, each time upon such a pixel line data is produced. In this case, the pixel line data of the respective scanning planes are stored in a predetermined first position of the respective frames of the multi-frame memory (e.g. addresses along the first row). Namely, M number of the pixel line data each having a different time phase, which are obtained by the B-mode scannings of M times at the position R1, are sequentially written into the predetermined addresses in each of the frames which corresponds to the position R1, respectively, upon it is produced.

Then, when the next control signal based on the cardiac signal (R-wave) is inputted, that is a second beat of the heart is detected, the position of the scanning plane (that is, a position where the scanning is to be carried out) is sifted or displaced for one step toward to the rotational direction thereof to the position R2 shown in FIG. 9.

At the position R2, in the same manner as the position R1, B-mode scannings are carried out for M times to form M scanning planes as shown in FIG. 9. Each time upon one B-mode scanning is carried out, the echo data obtained from each of the ultrasound beams which define the B-mode scanning plane is sequentially undergone the volume-rendering processing, thereby producing one pixel line data for each of the B-mode scanning planes.

In the same manner as described above, the one pixel line data corresponding to each of the scanning planes S1–SM is written into a predetermined position of each of the corresponding frames (memories) P1–PM of the multi-frame memory sequentially, each time upon such a pixel line data is produced. In this case, the pixel line data of the respective scanning planes are stored in the predetermined position of the respective frames of the multi-frame memory. Namely, M number of the pixel line data each having a different time phase which are obtained by the B-mode scannings for M times at the position R2 are sequentially written into the predetermined addresses (e.g. addresses along the second row) in each of the frames which corresponds to the position R2, respectively, upon it is produced.

When the above described processing is carried out until N-th beat of the heart in synchronization with the respective cardiac signals (R-wave), the multi-frame memory stores three-dimensional ultrasound image data for M ultrasound images which have different time phases during one periodical motion of the heart beat of the heart. Namely, each frame of the multi-frame memory stores three-dimensional ultrasound image data for one three-dimensional ultrasound image which is produced from N pixel line data obtained at the different positions but having the same time phase, respectively. In other words, since the period of the heart beats is constant, three-dimensional ultrasound image data stored in each of the frames of the multi-frame memory can produce a three-dimensional ultrasound image which represent a certain condition of the heart at the certain time phase of the periodical motion. Namely, the ultrasound image data stored in each of the frames is formed of N pixel line data which are obtained at the same time phase in the periodical motions of the heat beats of N times.

Therefore, if an ultrasound image is displayed based on the ultrasound image data stored in a particular frame corresponding to a particular time phase in a periodical motion of a heart, the displayed ultrasound image is a stationary three-dimensional ultrasound image representing the condition of the heart at the particular time phase.

Further, if the ultrasound image data stored in the respective frames of the multi-frame memory are sequentially and successively reproduced in a loop manner, it becomes possible to display a motion of a heart for one period through a three-dimensional motion picture image. Furthermore, if such a loop-reproduction is repeated, it becomes possible to display continuous motion of the heart through the motion picture image.

In this regard, it should be understood that, although one scanning plane is produced by one electronic scanning as described above, it is possible to ignore the motion of the heart during the formation of one B-mode scanning plane. This is because such an electronic scanning is performed quite rapidly rather than the motion of the heart (e.g. 30 to 50 times per second depending on the depth of the part to be diagnosed).

Further, in order to produce a clear three-dimensional motion picture image which shows the motion of the heart according to the above-described method, M which represents the number of the electronic scannings to be carried out at one position and the number of the frames of the frame memory is preferably set to 16–32. Further, N which represents the number of the displacements or steps of the scanning plane and the number of the heart beats to be sampled is preferably set to 60 to 90. In this regard, it is to be noted that the former is the case where the scanning plane is shifted or displaced by 3 degree at a time and the latter is the case where the scanning plane is shifted or displaced by 2 degree at a time.

Furthermore, it is also to be noted that the principle for the formation of the three-dimensional motion picture image described above with reference to FIG. 9 can be applied to cases where other scanning methods are employed. For example, it can be applied to the case shown in FIG. 2 in which a square scanning plane produced by a linear type array transducer is displaced in parallel to obtain a cubic shape three-dimensional data acquiring region or the case shown in FIG. 3 in which a scanning plane produced by a convex type array transducer is swung to obtain a three-dimensional data acquiring region having a shape as shown in the drawing. As stated in the above, in the cases where these scannings are carried out, the transformation of coordinates at the DSC as shown in FIG. 8 is not necessary. In addition to the above described two scannning methods, it is also possible to employ an transducer having a large number of transducer elements which are arranged in matrix, in which transducer elements arranged on a desired line are selectively energized such that the position of the scanning plane is shifted or displaced.

Furthermore, it is also to be noted that according to the method described above, each time upon scannings are carried out for M times at each of the N positions in the rotational direction, echo data obtained from the respective scanning planes are successively processed and then written into the predetermined frames of the frame memory in the form of the pixel line data. Such pixel line data are successively fed to the DSC and then they are reproduced into a display image. Therefore, according to the present invention, an ultrasound image for the already scanned part of the three-dimensional region can be produced almost simultaneously with the displacement (scan) of the ultrasound probe. Therefore, when any problem such as a distortion of the displayed image or the like would be found by observing an displayed image which is in the course of formation, it is possible to cancel the acquired data and to re-start data acquiring process from the beginning. Alternatively, it is also possible to preserve the acquired data in an appropriate memory, and an appropriate correction may be made to the errored data stored in the memory.

Next, a preferred embodiment of an ultrasound diagnostic apparatus according to the present invention will be described with reference to FIG. 10.

Figure 10:
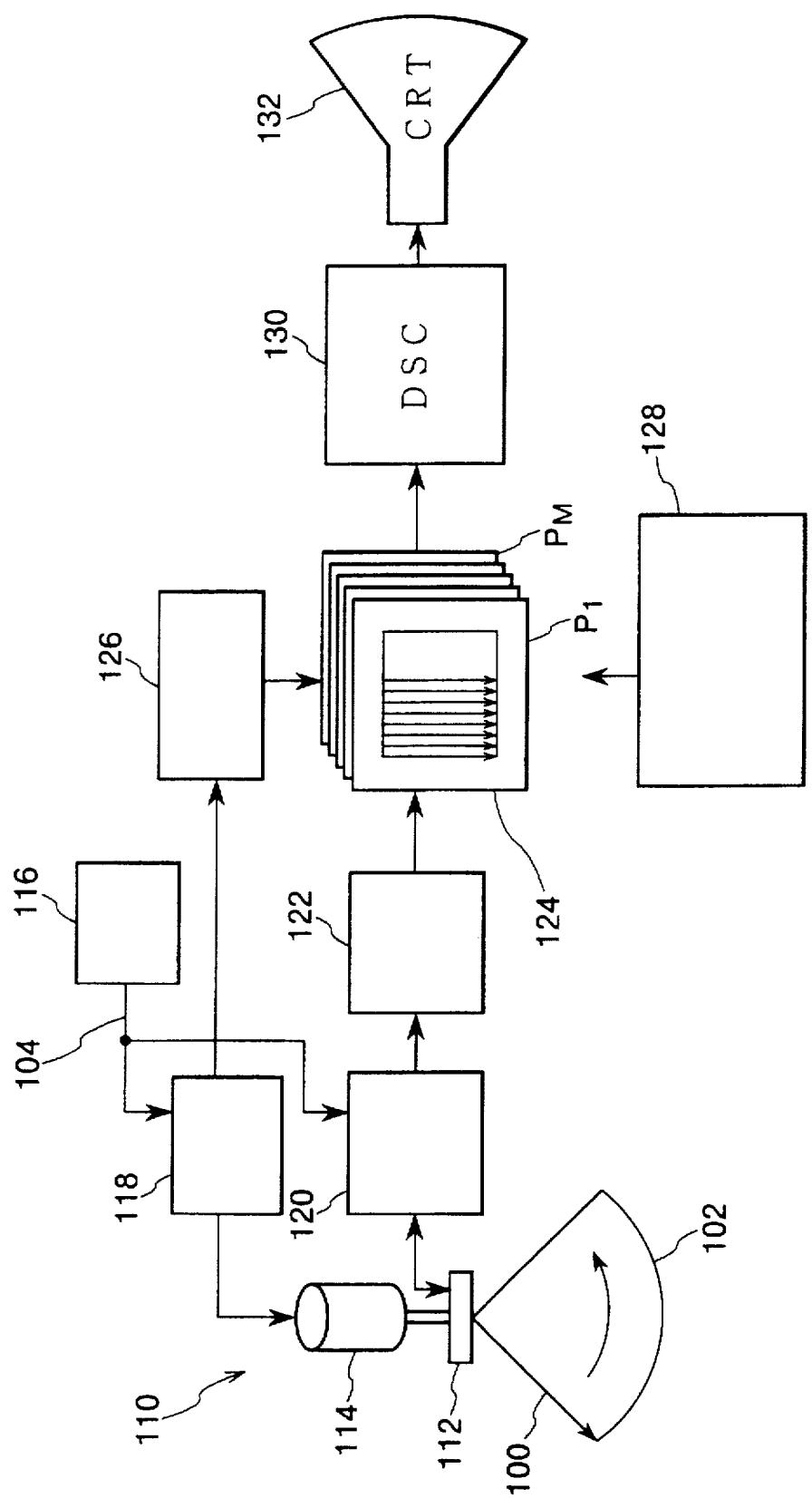
FIG. 10 is a block diagram which shows an overall construction of the ultrasound diagnostic apparatus according to the present invention.

FIG. 10 is a block diagram which shows an overall construction of the ultrasound diagnostic apparatus. In this drawing, the reference numeral 110 denotes an ultrasound probe which can acquire echoes from a three-dimensional region as previously described. In this embodiment, the ultrasound probe is roughly composed of a sector type array transducer 112 and a driving mechanism (scanning plane displacing means) 114. The array transducer is formed of a plurality of transducer elements which emit ultrasound beams 100 in a sector shape when they are energized, to form a sector-shaped scanning plane in the same way as the transducer shown in FIG. 8.

The driving mechanism 114 is, for example, composed of a mechanism having a motor and the like, which is used for rotationally displacing the scanning plane 102 for N steps, that is for changing or displacing a position where a scanning is to be carried out in a rotational direction for N steps. In this regard, it is preferred that the scanning plane can be rotated for 180 degree over 60–90 steps as described above. As a result, when the scanning plane is rotationally displaced, it is possible to obtain a conical shape three-dimensional echo data acquiring region with a spherical bottom surface.

A motor control section 118 is provided for controlling the driving mechanism 114. Namely, the motor control section 118 controls the driving mechanism 114 so that a position of the scanning plane 102 is displaced for N steps in synchronization with a cardiac signal (R-wave) 104 outputted from an electrocardiogram (ECG) 116. In the same manner as the driving device 24 shown in FIG. 1, a position of the scanning plane in the rotational direction is also detected for identifying the scanning position. The motor control section 118 and the driving mechanism 114 constitute the displacing means in the present invention.

The cardiac signal outputted from the ECG 116 is also supplied to a transmission and reception controlling section 120. The transmission and reception controlling section 120 controls transmission and reception of the ultrasound beams in synchronization with the cardiac signal 104. Namely, when a transmission signal is supplied to the array transducer 112 from the transmission and reception controlling section 120, ultrasound beams are emitted, thereby electronic scanning is carried out under the control by the transmission and reception controlling section 120.

Echoes of the reflected ultrasound beams are received by the array transducer 112 and converted into electrical signal (echo signals). The echo signals are fed to the transmission and reception controlling section 120 where the echo signals are amplified. The echo signals are then A/D converted into digital echo data and the echo data is inputted into an image data producing section (image processor) 122.

In the image data producing section 122, the echo data of the ultrasound beams which define the respective scanning plane S is sequentially processed to obtain a predetermined brightness value data for each of the ultrasound beams, and the brightness value data for the ultrasound beams of each of the scanning planes S is outputted in the form of one pixel line data as explained with reference to FIG. 8 and FIG. 9. In this embodiment, the image data producing section 122 corresponds to the three-dimensional data producing section 37 shown in FIG. 1, where the echo data obtained from the respective ultrasound beams is undergone the volume-rendering processing by the electrical circuit as shown in FIG. 7. Therefore, by appropriately adjusting a setting of the value of the opacity for the volume-rendering processing (see, the opacity adjuster 44 in FIG. 7), it is possible to change the property of the outputted pixel line data so as to selectively display either of a three-dimensional surface image of an object (heart) or a three-dimensional transparent image thereof.

In FIG. 10, the reference numeral 124 denotes the multi-frame memory which is discussed with reference to FIG. 9. The multi-frame memory 124 is composed of a plurality of frames (virtual memory surfaces) P1–PM as shown in FIG. 9, where each of the frames acts as a frame memory which stores ultrasound image data for one three-dimensional ultrasound image at a certain time phase in the periodical motions of the heart as described above. Preferably, the multi-frame memory is composed of 16–32 frames.

Further, the reference numeral 126 denotes a writing control section. The writing control section 126 controls, in response to a control signal provided by the motor controlling section 118, writing operation of the pixel line data outputted from the image data producing section 122 to the corresponding predetermined frames P1–PM of the frame memory 124 in accordance with the manner as described above.

The ultrasound image data for three-dimensional ultrasound images written into each of the frames of the multi-frame memory 124 are sequentially read out and then fed to the DSC 130. In this regard, a loop reproduction control section 128 is provided for controlling sequential readout of the ultrasound image data stored in the respective frames P1–PM or repetition thereof, thereby enabling to display the three-dimensional ultrasound image in the form of a motion picture image.

As explained in FIG. 8, the DSC 130 performs the transformation of coordinates for the ultrasound image data read out from the multi-frame memory 124. The ultrasound image data outputted from the DSC 130 is D/A converted and then fed to a display 132 such as a CRT.

In the ultrasound diagnostic apparatus as described above, if an ultrasound image is displayed based on the ultrasound image data stored in a particular frame corresponding to a particular time phase in a periodical motion of a heart, the displayed ultrasound image is a stationary three-dimensional ultrasound image representing the condition of the heart at the particular time phase. Further, if the ultrasound image data stored in the respective frames of the multi-frame memory are sequentially and successively reproduced in a loop manner, it becomes possible to display a motion of a heart for one period through a three-dimensional motion picture image. Furthermore, if such a loop-reproduction is carried out repeatedly, it becomes possible to display continuous motion of the heart beats through the motion picture image which is seen as if the motions of the heart is being observed in a real time base.

The ultrasound diagnostic apparatus described above is preferably used for diagnosing condition of a heart from the outside of the patient through a three-dimensional ultrasound image thereof. However, the ultrasound diagnostic apparatus can be also used when condition of the heart is observed by a transesophagus probe to be inserted into esophagus of the patient.

Further, although in the embodiment described above controls are carried out in synchronization with R-wave from a heart of a patient, it is possible to utilize other waves from the heart. Further, it is of course possible to utilize other signals emitted from a living body as a control signal. Examples of such other signals include a pulse wave and a respiration signal or the like.

Furthermore, although in the above embodiment the description is made with reference to the case where the volume-rendering technique developed by the inventors are used for producing a three-dimensional ultrasound image, it is possible for the present invention to employ other known methods for producing a three-dimensional ultrasound image such as a cumulative method and a projecting method and the like. Further, the present invention may be applied to various image processing apparatuses other than ultrasound diagnostic apparatuses if an image of an object in motion is required to display through a three-dimensional motion picture image.

As described above, according to the present invention, it is possible to display a three-dimensional ultrasound image of an internal organ in motion such as a heart clearly without any affect by the motion of the heart. Further, such a three-dimensional ultrasound image can be displayed in the form of a motion picture. Therefore, according to the present invention, it is expected that accuracy for diagnosing disease will be remarkably improved due to its new and unique display image.

Finally, although this invention has been described in its preferred embodiment with a certain degree of particularity, it is to be understood that the present disclosure of the preferred embodiment can be changed in details of construction and that the combination and arrangement of parts may be changed without departing from the spirit and the scope of this invention as hereinafter claimed.

What is claimed is:

1. An ultrasound diagnostic apparatus, comprising:

(a) an ultrasound transducer for emitting ultrasound beams and receiving reflected beams to form a scanning plane, and for displacing said scanning plane three-dimensionally for N steps, where N is a positive integer greater than 1;

(b) image data producing means for obtaining predetermined brightness value data of respective received ultrasound beams which define the respective scanning plane based on echoes thereof and for outputting the brightness value data of the ultrasound beams of the respective scanning plane as one pixel line data;

(c) memory means for storing ultrasound image data of M ultrasound images into M frames, where M is interger greater than 1, the ultrasound image data of each of the M ultrasound images being comprised of N pixel line data produced by said image data producing means;

(d) writing control means for sequentially storing M pixel line data each having a different time phase to the corresponding positions of the respective frames of the memory means, said M pixel line data being obtained by carrying out the scanning at each position of the N steps for M times; and (e) display controlling means for reading out the ultrasound image data stored in the respective frames of the memory means one by one and displaying an ultrasound image based on the ultrasound image data.

2. The ultrasound diagnostic apparatus as claimed in claim 1, wherein the scanning and the displacement of the scanning plane is controlled by a control signal.

3. The ultrasound diagnostic apparatus as claimed in claim 2, wherein said control signal is a signal from a living body caused by periodical motions of an internal organ of a patient.

4. The ultrasound diagnostic apparatus as claimed in claim 2, wherein the control signal is synchronized with a cardiac signal of a heart of a patient.

5. The ultrasound diagnostic apparatus as claimed in claim 4, wherein the cardiac signal is a R-wave emitted from a heart of the patient, wherein the M times of the scannings are carried out within one period between the R-waves, and the scanning plane is displaced for N steps in synchronization with each R-wave.

6. The ultrasound diagnostic apparatus as claimed in claim 4, further comprising an electrocardiogram for detecting condition of the heart of the patient.

7. The ultrasound diagnostic apparatus as claimed in claim 1, wherein said scanning plane is displaced for N steps by a displacing means.

8. The ultrasound diagnostic apparatus as claimed in claim 1, wherein said ultrasound transducer includes an array transducer having a plurality of aligned transducer elements which are electronically energized to form the scanning plane, and a mechanism for mechanically displacing the scanning plane for N steps.

9. The ultrasound diagnostic apparatus as claimed in claim 8, wherein said mechanism displaces the scanning plane in parallel with the preceding scanning plane.

10. The ultrasound diagnostic apparatus as claimed in claim 8, wherein said mechanism displaces the scanning plane pivotally.

11. The ultrasound diagnostic apparatus as claimed in claim 8, wherein the scanning plane is a sector-shaped B mode scanning plane and said mechanism rotates the scanning plane for N steps about a vertical axis passing an apex thereof.

12. The ultrasound diagnostic apparatus as claimed in claim 1, wherein said image data producing means selectively produces pixel line data from which a three-dimensional surface image or a three-dimensional transparent image can be produced.

13. The ultrasound diagnostic apparatus as claimed in claim 1, wherein said memory means is a multi-frame memory having M frame memories.

14. The ultrasound diagnostic apparatus as claimed in claim 1, wherein said display controlling means includes loop reproduction means which reproduces the ultrasound image data stored in the M frames of the memory means successively.

15. A method of forming an ultrasound image, comprising the steps of:

(a) performing a plurality of electronic scannings with ultrasound beams for a part of a patient which repeats periodical motion within one period of the periodical motions at a predetermined position in response to an input of a predetermined signal;

(b) obtaining a predetermined brightness value data of the respective beams based on echoes of the ultrasound beams which define the scanning plane of the respective scanning, and producing a plurality of pixel line data of different time phase for each of the respective scannings based on the brightness value data;

(c) storing the pixel line data of the respective scannings sequentially in corresponding positions of a plurality of memories;

(d) displacing a position where the scannings are to be carried out for a plurality of steps and performing a plurality of electronic scannings at respective positions of the plurality of steps of the displacements, and storing the pixel line data of the different time phases obtained at the respective displaced positions into a region of the respective memories; and (e) reproducing the thus-obtained ultrasound image data stored in the respective memories and comprised of the plurality of pixel line data one by one successively.

16. The method of forming an ultrasound image as claimed in claim 15, wherein said predetermined signal is a signal from a living body caused by periodical motions of an internal organ of a patient.

17. The method of forming an ultrasound image as claimed in claim 16, wherein the predetermined signal is synchronized with a cardiac signal of a heart of a patient.

18. The method of forming an ultrasound image as claimed in claim 17, wherein the cardiac signal is a R-wave emitted from a heart of the patient, wherein the plurality of the scannings are carried out within one period between the R-waves, and the scanning plane is displaced for N steps in synchronization with each R-wave.

19. An ultrasound image processing apparatus, comprising:

(a) an ultrasound transducer which can carry out a plurality of electronic scannings at each of different N positions so as to cover a three-dimensional region, where N is a positive integer greater than 1;

(b) a plurality of memories for sequentially storing echo data obtained from the respective scannings at each of the N positions, each echo data having a different time phase and said each echo data being stored in the respective memories in the form of one pixel line data;

(c) means for sequentially reproducing ultrasound image data which is stored in each of the memories, each ultrasound image data being produced from a plurality of the pixel line data, and each pixel line data having a corresponding time phase obtained at each of the N positions; and (d) means for displaying an ultrasound image as a motion picture based on the ultrasound image data which are successively reproduced by said reproducing means.

20. The ultrasound image processing apparatus as claimed in claim 19, wherein the respective scannings are carried out in synchronization with a predetermined periodical signal.

21. The ultrasound image processing apparatus as claimed in claim 20, wherein said one pixel line data is formed of brightness value data which are produced by reflecting changes of echoes of echo data obtained from a plurality of sampling points of the beam projecting direction of the respective ultrasound beams which define the respective scanning plane.

22. A method for diagnosing a heart of a patient, comprising the steps of:

(a) holding an ultrasound transducer for transmitting and receiving ultrasound beams to and from a heart of a patient at a first position, and carrying out a plurality of B-mode electronic scannings at the first position in response to a R-wave from the heart of the patient;

(b) obtaining brightness value data based on echo data for respective ultrasound beams which define the respective scanning plane obtained by the B-mode scanning to produce one pixel line data corresponding to the respective B-mode scannings;

(c) storing the one pixel line data corresponding to the respective B-mode scanning to a first position of each of a plurality of memories;

(d) carrying out a plurality of B-mode electronic scanning at a second position spaced from the first position in response to the next R-wave;

(e) producing one pixel line data corresponding to each of the plurality of B-mode scannings at the second position;

(f) storing each of the thus-produced one pixel line data corresponding to the respective B-mode scannings at the second position to a second position of the respective memories; and (g) sequentially reproducing ultrasound image data stored in the respective memories which are obtained by repeating the steps (a) to (f) and displaying an ultrasound image based on the reproduced ultrasound image data for observation.

* * * * *